United States Patent
Davis et al.

(10) Patent No.: US 7,533,252 B2
(45) Date of Patent: May 12, 2009

(54) OVERRIDING A STATIC PREDICTION WITH A LEVEL-TWO PREDICTOR

(75) Inventors: Mark C. Davis, Portland, OR (US); Stephan Jourdan, Portland, OR (US); Robert L. Hinton, Hillsboro, OR (US); Boyd S. Phelps, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 120 days.

(21) Appl. No.: 11/513,709

(22) Filed: Aug. 31, 2006

(65) Prior Publication Data

US 2008/0059779 A1 Mar. 6, 2008

(51) Int. Cl.
*G06F 9/00* (2006.01)

(52) U.S. Cl. ...................... 712/239; 712/240

(58) Field of Classification Search ............. 712/239, 712/240
See application file for complete search history.

(56) References Cited

U.S. PATENT DOCUMENTS

| | | | | |
|---|---|---|---|---|
| 5,142,634 A * | 8/1992 | Fite et al. | ............... | 712/240 |
| 5,163,140 A * | 11/1992 | Stiles et al. | ............... | 711/140 |
| 5,313,634 A * | 5/1994 | Eickemeyer | ............... | 712/240 |
| 5,752,014 A * | 5/1998 | Mallick et al. | ............... | 712/240 |
| 5,805,878 A * | 9/1998 | Rahman et al. | ............... | 712/239 |
| 6,230,261 B1 * | 5/2001 | Henry et al. | ............... | 712/240 |
| 6,269,438 B1 * | 7/2001 | Chang | ............... | 712/233 |
| 6,374,349 B1 | 4/2002 | McFarling | ............... | 712/239 |
| 6,425,075 B1 * | 7/2002 | Stiles et al. | ............... | 712/239 |
| 6,427,192 B1 * | 7/2002 | Roberts | ............... | 711/133 |
| 6,550,004 B1 * | 4/2003 | Henry et al. | ............... | 712/239 |
| 6,553,488 B2 * | 4/2003 | Yeh et al. | ............... | 712/239 |
| 6,571,331 B2 * | 5/2003 | Henry et al. | ............... | 712/239 |
| 7,024,545 B1 * | 4/2006 | Zuraski et al. | ............... | 712/240 |
| 7,058,795 B2 * | 6/2006 | Kacevas et al. | ............... | 712/239 |
| 2004/0210749 A1 * | 10/2004 | Biles | ............... | 712/240 |
| 2005/0132174 A1 | 6/2005 | Jourdan et al. | ............... | 712/239 |
| 2005/0149707 A1 | 7/2005 | Jourdan et al. | ............... | 712/239 |

OTHER PUBLICATIONS

Egan, Colin, Steven, Gordon, Vintan, Lucian. "Cached Two-level Adaptive Branch Predictors with Multiple Stages" ARCS 2002, LNCS 2299, pp. 179-191, 2002.*

U.S. Appl. No. 11/416,820, filed May 3, 2006, entitled "Providing Storage In A Memory Hierarchy For Prediction Information" by Scott McFarling.

* cited by examiner

*Primary Examiner*—Eddie P Chan
*Assistant Examiner*—Jacob Petranek
(74) *Attorney, Agent, or Firm*—Trop, Pruner & Hu, P.C.

(57) ABSTRACT

In one embodiment, the present invention includes a method for determining if an entry corresponding to a prediction address is present in a first predictor, and overriding a prediction output from a second predictor corresponding to the prediction address if the entry is present in the first predictor. Other embodiments are described and claimed.

12 Claims, 8 Drawing Sheets

OVERRIDING A STATIC PREDICTION WITH A LEVEL-TWO PREDICTOR

BACKGROUND

Predicting the direction of conditional branches is one of the key bottlenecks limiting processor performance. Various techniques have been proposed and implemented to perform such predictions. Some processors implement a sequence of dynamic prediction stages, each improving on the previous stage, and each using a different type of predictor. A tag-hit generated from an array access using a branch address is used to determine whether the prediction from the current stage should replace the prediction coming from the previous stage. These dynamic predictions use branch history (local or global), path information, or other information generated during execution of a program. Accordingly, as execution continues dynamic predictions can become more refined and thus improve over time.

The end result generated by a predictor is a prediction of the direction of the conditional branch. Based on this prediction, a processor can begin execution of the path predicted by the predictor. In this way, improved performance may be realized, as predictive or speculative execution may occur and then may be committed if the prediction proves to be correct. One of the key limits to a predictor is that it must be kept small, so that the predictor can be able to generate new predictions rapidly to keep up with a processor pipeline. Unfortunately, this small size prevents the predictor from holding all of the branch targets or branch patterns it may see. Furthermore, the small size may cause frequent disruptions or evictions of data present in the predictor. These disruptions can be both time consuming and prevent maintenance of prediction information that may prove valuable during program execution.

For conditional branches that do not have historical information present in a dynamic predictor, static prediction information may be available to provide a static prediction. Such static predictions are based not on actual program operation, but instead on predetermined characteristics with respect to a given branch, which could include branch direction, opcode, displacement length, or any other piece or combination of information available at compile time. While these static predictions are generally accurate, they can cause mispredictions, owing to their static nature.

DETAILED DESCRIPTION

In various embodiments, predictions generated in a static predictor may be overridden where additional prediction information exists that indicates that the static prediction for a given branch address is likely to be in error. In different implementations, a so-called level two (L2) predictor may be present to store information from an evicted prediction of a dynamic predictor within a branch prediction unit (BPU). When an analysis of this evicted data indicates that a corresponding static prediction is likely to cause a misprediction, information corresponding to the evicted data may be stored in the L2 predictor. The data from the evicted prediction may be used to enhance future static branch predictions for this branch.

Figure 1:
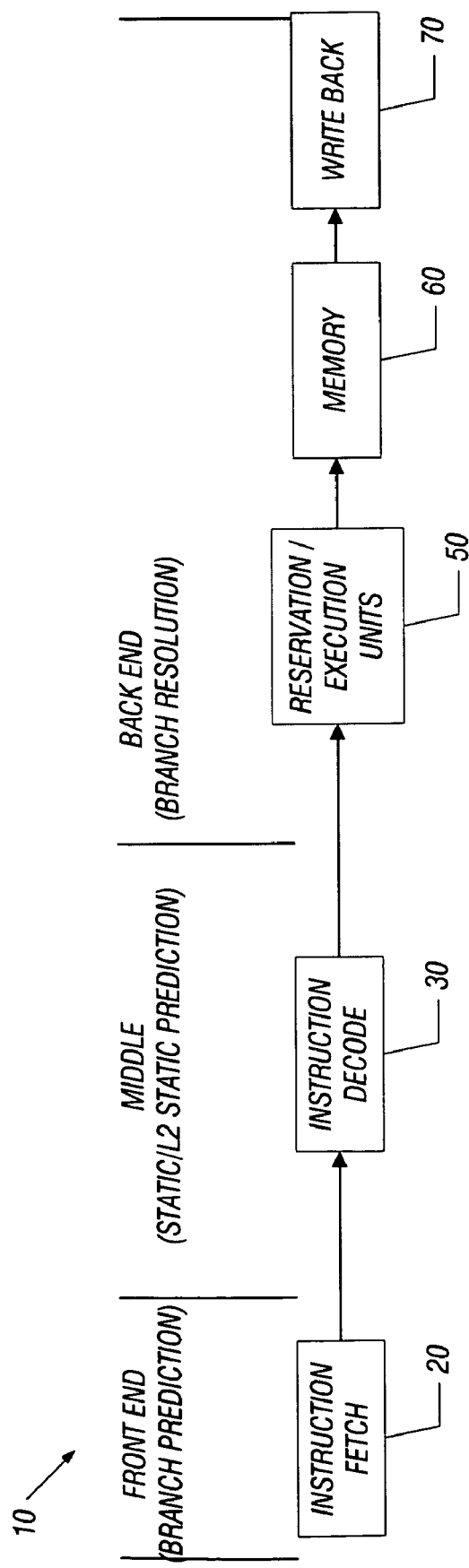
FIG. 1 is a block diagram of a processor in accordance with one embodiment of the present invention.

Referring now to FIG. 1, shown is a block diagram of a processor in accordance with one embodiment of the present invention. As shown in FIG. 1, processor 10 may be a multi-stage pipeline processor. Note that while shown at a high level in FIG. 1 as including six stages, it is to be understood that the scope of the present invention is not limited in this regard, and in various embodiments many more than six such stages may be present. As shown in FIG. 1, the pipeline of processor 10 may begin at a front end with an instruction fetch stage 20, in which instructions are fetched from, e.g., an instruction cache or other location. Note that during this stage, branch predictions may be performed. That is, a BPU may perform a dynamic prediction if data is present in the predictor corresponding to address information associated with the fetched instruction. As will be described further below, different types of predictors may be present. If no information is present in the BPU, no prediction is made at this stage (i.e., no dynamic prediction occurs).

From instruction fetch stage 20, data passes to an instruction decode stage 30, in which instruction information is decoded, e.g., an instruction is decoded into micro operations (μops). Note that in this middle portion of the processor pipeline (e.g., instruction decode stage 30), additional prediction operations may be performed. More specifically, static predictions may be performed for addresses that missed in the earlier BPU. Such static predictions do not depend on analysis of actual running of the program. Instead, such static predictions are based on static parameters of a given instruction. The information for the static predictor may be provided by instruction decode. Accordingly, the static predictions remain fixed and do not vary during program operation. For example, a branch operation that branches to a backwards location may be statically predicted as taken (T). Similarly, a not taken (NT) prediction may occur if a branch branches forward or more than a predetermined distance backward. Such static predictions may be performed using a heuristic predictor, in some embodiments.

While such static predictions are often correct, their accuracy is limited due to their static nature. Accordingly, in various embodiments a so-called L2 static predictor may also be present and used to override a static prediction based on previously-obtained dynamic information. That is, an L2 predictor, also referred to herein as an override predictor, may store prediction information for dynamic predictions that have been evicted from the BPU. When such evicted prediction information conflicts with a corresponding static prediction, which is expected to occur in the future, an entry (tag) may be stored or allocated within the L2 static predictor. Thus when a hit occurs to this L2 static predictor, the output of the static prediction may be inverted.

Still referring to FIG. 1, when needed data for an operation is obtained and present within the processor's registers, control passes to a back end stage, namely reservation/execution units 50, which may be used to assign an execution unit for performing the operation and provide the data to the execution unit. Upon execution, the resulting information is provided to a memory stage 60, which accesses memory for load and store operations, and finally a write back stage 70 writes back the data into architecturally defined registers.

Note that in back end processing, branch resolution occurs. That is, based on actual program execution, it may be determined whether a previous branch prediction was correct or was mispredicted. Based on this actual branch information, the BPU may be updated. Accordingly, a count associated with a previously predicted branch may be incremented (or decremented) based on the actual operation. Furthermore, a new entry may be allocated for, e.g., a branch that was not present in the BPU and which was mispredicted using static information. Still further, if no prediction information was present for a given branch in the dynamic predictor, an entry may be allocated for this new prediction information. While described with this particular implementation in the embodiment of FIG. 1, it is to be understood that the scope of the present invention is not limited in this regard and embodiments may be used in many different processor architectures.

Figure 2:
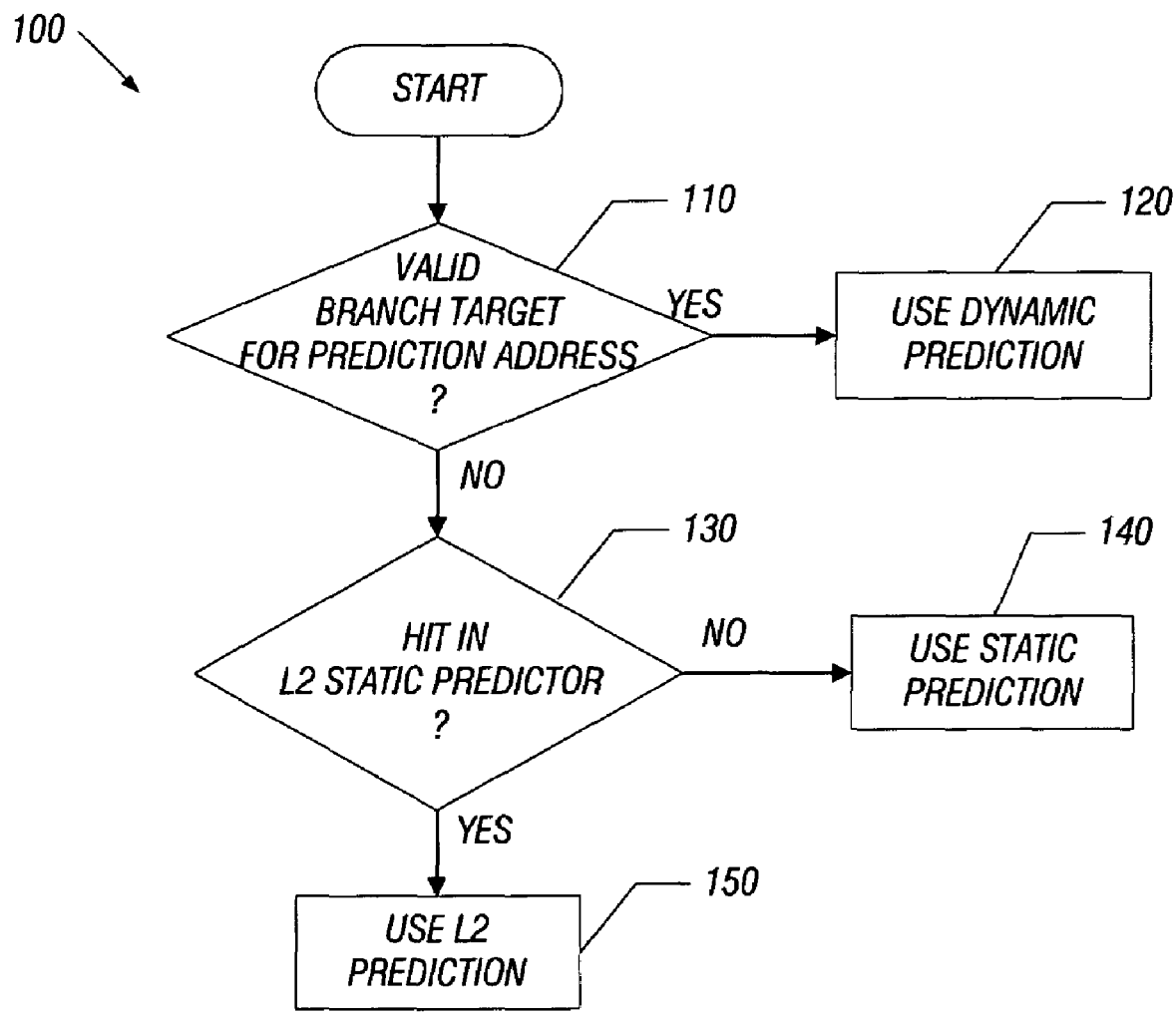
FIG. 2 is a flow diagram of a predictor selection method in accordance with one embodiment of the present invention.

Referring now to FIG. 2, shown is a flow diagram of a method in accordance with one embodiment of the present invention. More particularly, method 100 shows an example method for using prediction information at various stages of a processor pipeline. As shown in FIG. 2, method 100 may begin by determining if a valid branch target for a prediction address exists (diamond 110). The prediction address may be for a branch or a line of bytes (such as when microoperations or instructions are not yet available). That is, a tagged dynamic predictor, e.g., a target array, may be accessed using at least a tag portion an address to determine if an entry exists in the predictor structure for that address. The entry may contain a target address, static prediction, and offset for certain byte/branch/line predictions. If a hit occurs at diamond 110, control passes to block 120. There, one or more dynamic predictors are accessed and arbitrated, and a dynamic prediction may be used to predict the result of a conditional operation. Note that the operations of diamond 110 and block 120 may be performed early in a processor, such as the front end stages shown in FIG. 1.

If instead at diamond 110 it is determined that the branch prediction does not hit in the dynamic predictor, control passes to diamond 130. There, it may be determined whether the prediction address hits in an L2 static predictor (diamond 130). That is, the tag portion may be used to access the L2 static predictor to determine whether an entry corresponding to that address exists there. While not shown in FIG. 2, note that in parallel with the determination of diamond 130, the prediction address also may be used to access a static predictor to obtain a static prediction corresponding to the address. If the prediction address does not hit in the L2 static predictor, control passes to block 140. At block 140, the static prediction (i.e., obtained in parallel with accessing the L2 static predictor) may be used to provide a static prediction for the prediction address. As described above, the static prediction is generally accurate, and in various implementations accuracy of up to 90% can be achieved.

To provide improved predictions where the static prediction is likely to be in error, if a hit occurs in the L2 static predictor (as determined at diamond 130), the static prediction that otherwise would have been used at block 140 may be overridden. That is, as shown in block 150 the L2 static prediction information may be used to provide a prediction corresponding to the prediction address. In many implementations, to reduce the size of entries within the L2 static predictor, no actual prediction information is stored. Instead, if the branch address hits in the L2 static predictor, an output signal from the predictor may be used to override the static prediction for that target address. While described with this particular implementation in the embodiment of FIG. 2, it is to be understood the scope of the present invention is not limited in this regard, and other manners of using prediction information in an additional predictor may be realized to improve accuracy of static predictions.

Figure 3:
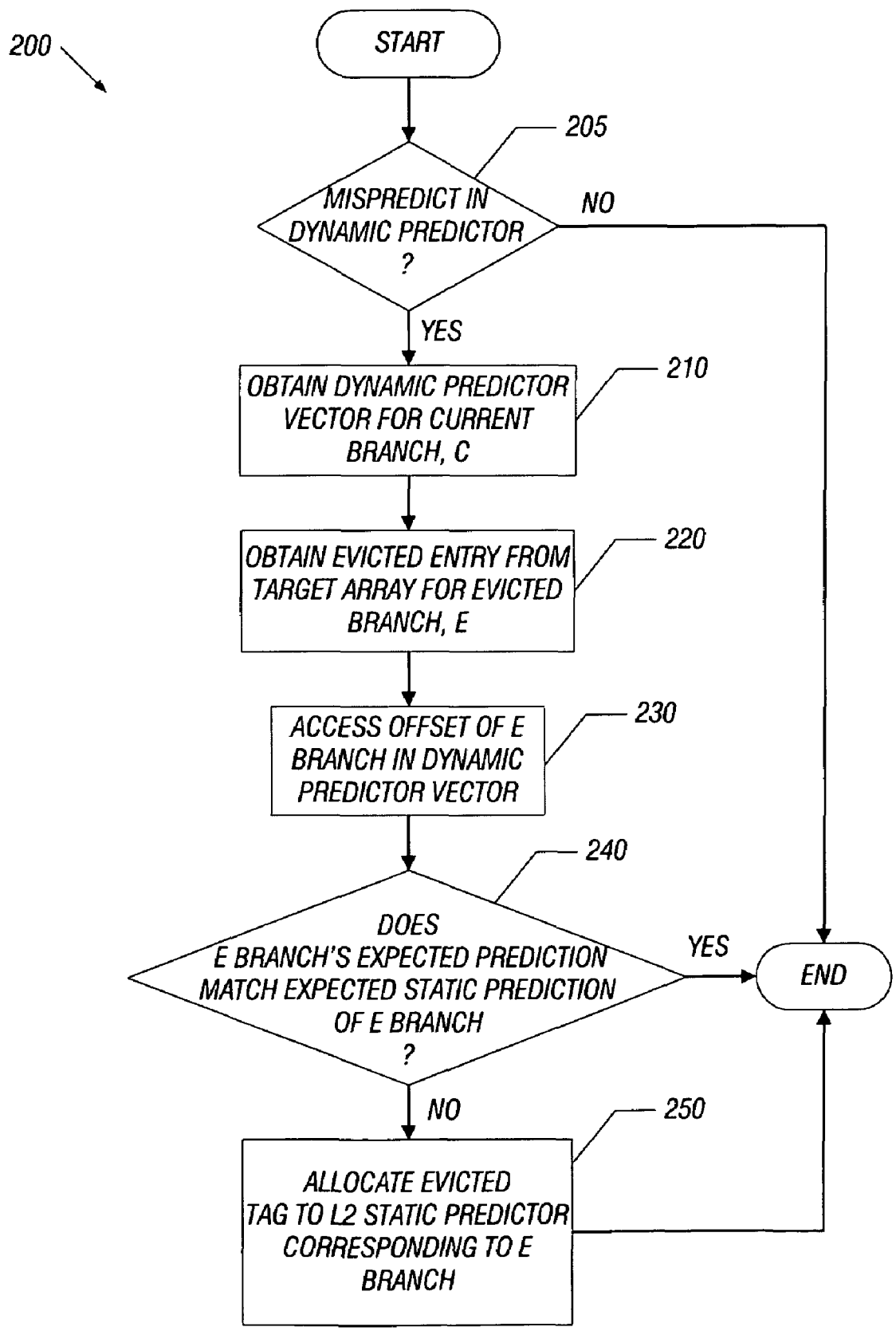
FIG. 3 is a flow diagram of an allocation method in accordance with an embodiment of the present invention.

To be able to use prediction information in an L2 static predictor in accordance with an embodiment of the present invention, the information is first allocated to the L2 static predictor. Referring now to FIG. 3, shown is a flow diagram of an allocation method in accordance with an embodiment of the present invention. More specifically, method 200 may be used to allocate entries to an L2 static predictor from evicted entries of a dynamic predictor. As shown in FIG. 3, method 200 may begin by determining whether a misprediction occurred in a dynamic predictor (diamond 205). That is, at branch resolution time (i.e., at instruction execution or retirement), it may be determined whether a prediction provided by a dynamic predictor was incorrect. If the dynamic prediction is correct, method 200 may conclude.

If instead a misprediction occurs, control passes to block 210. At block 210, a dynamic predictor vector may be obtained for the current branch, C. The vector may be obtained by accessing the dynamic predictor(s) in the BPU. Because of the locality between the addresses of the current branch and the entry being evicted from the target array, the dynamic predictor vector may also include prediction information for a branch that is to be evicted from the dynamic predictor.

Referring still to FIG. 3, from block 210, control passes to block 220, where the evicted entry may be obtained from a target array. This evicted entry may correspond to an evicted branch, E. Using information from the evicted entry, namely offset information and static prediction information, an offset may be accessed within the current branch's dynamic prediction vector (block 230). That is, this offset may be used to access dynamic prediction information in the vector for the evicted branch. From block 230, control passes to diamond 240, where it may be determined whether the evicted branch's expected prediction, based on the state of the dynamic prediction vector, matches the expected static prediction, which is stored in the array and accessed along with the offset of the evicted branch. If the predictions match, there is no need to allocate an entry to the L2 static predictor, as the static prediction stored in the array for the evicted entry matches the dynamic prediction of the evicted branch, and method 200 concludes. Note that the prediction vector may be updated so that it can be as accurate as possible. In one embodiment, a subset of all the dynamic predictor's prediction information may be used to form a vector that will approximate the actual dynamic predictor information of the evicted branch.

If instead it is determined that the predictions do not match, control passes from diamond 240 to block 250. At block 250, an entry (tag) may be allocated in the L2 static predictor corresponding to the evicted branch address obtained from the target array address and evicted entry offset. That is, because the predictions differ, the static prediction likely would mispredict in the future. Accordingly, an entry allocated in the L2 static predictor, when it hits, may be used to override the likely incorrect static prediction.

Note that in various implementations, the allocation may be effected by storing a tag corresponding to the evicted branch in the L2 static predictor. Because entries may only be allocated when there is a likely incorrect static prediction, there is no need to store the actual prediction, reducing storage space within the L2 static predictor. While shown with this particular implementation in the embodiment of FIG. 3, the scope of the present invention is not limited in this regard.

Figure 4:
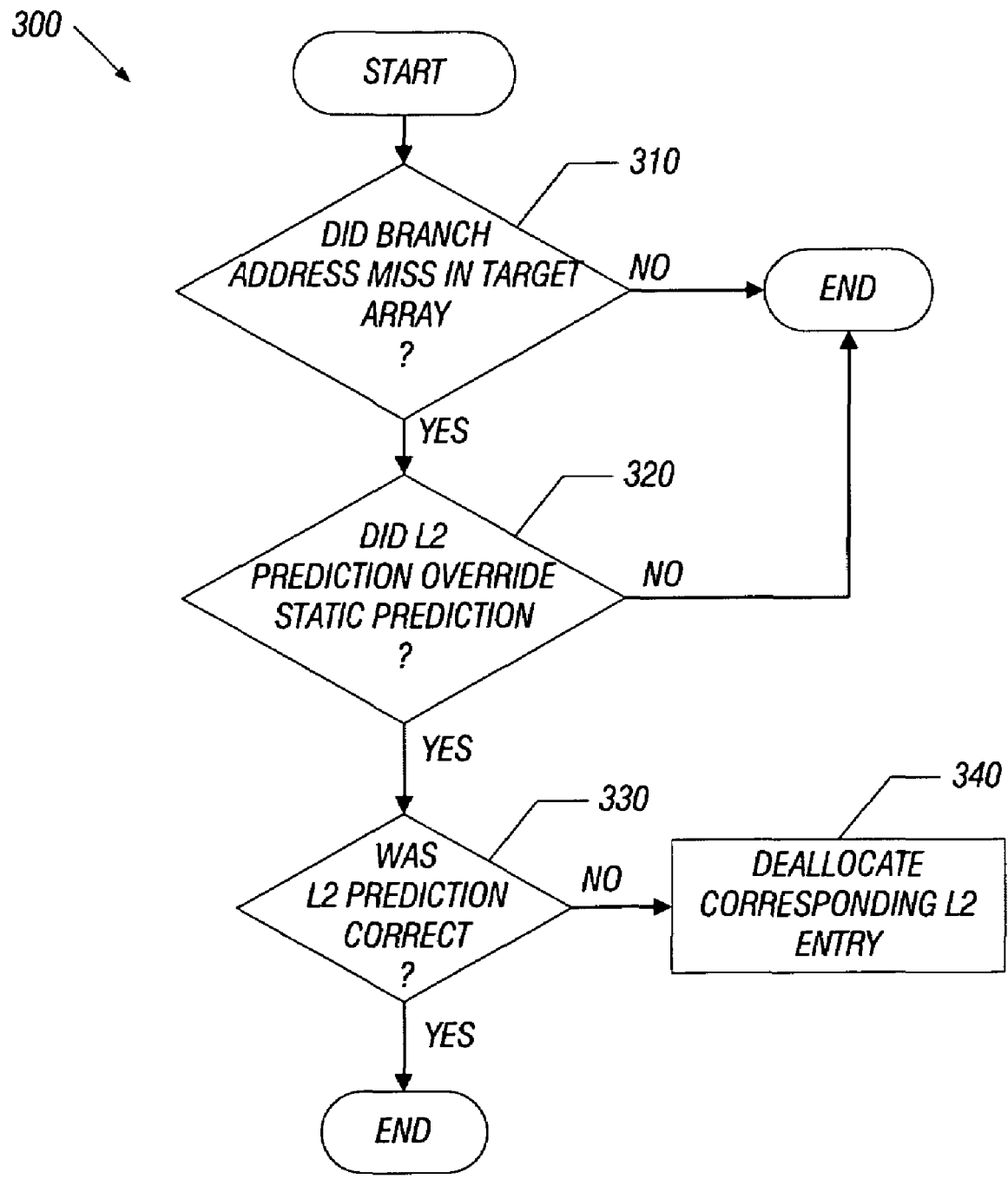
FIG. 4 is a flow diagram of a method for deallocating an entry of a predictor in accordance with an embodiment of the present invention.

Note that if a prediction in the L2 static predictor is incorrect (i.e., a misprediction results), the entry for that prediction may be evicted from the L2 predictor. Referring now to FIG. 4, shown is a flow diagram of a method for deallocating an entry in an L2 static predictor in accordance with an embodiment of the present invention. Note that method 300 may be performed at update time (i.e., at instruction execution). As shown in FIG. 4, method 300 may begin by determining if a branch address misses in a target array (diamond 310). If there is no miss in the target array, method 300 may end. That is, because a prediction exists in the target array, no static prediction is used and accordingly there is no need for update.

If instead at diamond 310 it is determined that there was a target array miss, next it may be determined whether an L2 prediction overrode a static prediction (diamond 320). If no such override occurred, this means there was no L2 entry corresponding to the target address. Accordingly, there is no need to perform any update of the L2 static predictor. Accordingly, method 300 concludes.

If instead at diamond 320 it is determined that there was an L2 prediction override (i.e., a previously evicted prediction from a target array conflicted with a corresponding static prediction), control passes to diamond 330. At diamond 330, it may be determined whether the L2 prediction was correct based on actual execution (diamond 330). If the prediction was correct, there is no need to update the predictor and accordingly method 300 ends. If instead the L2 prediction was a misprediction, control passes to block 340. At block 340, the corresponding L2 entry may be deallocated. Note that technically, there is no updating of the entry, it is instead deallocated or evicted. Because of the eviction, the correct static prediction (i.e., the opposite of the deallocated entry) from the static predictor is used to predict on a next execution of the branch. While described with this particular implementation in the embodiment of FIG. 4, it is to be understood that deallocation of entries from an L2 static predictor may be realized in other ways.

Figure 5:
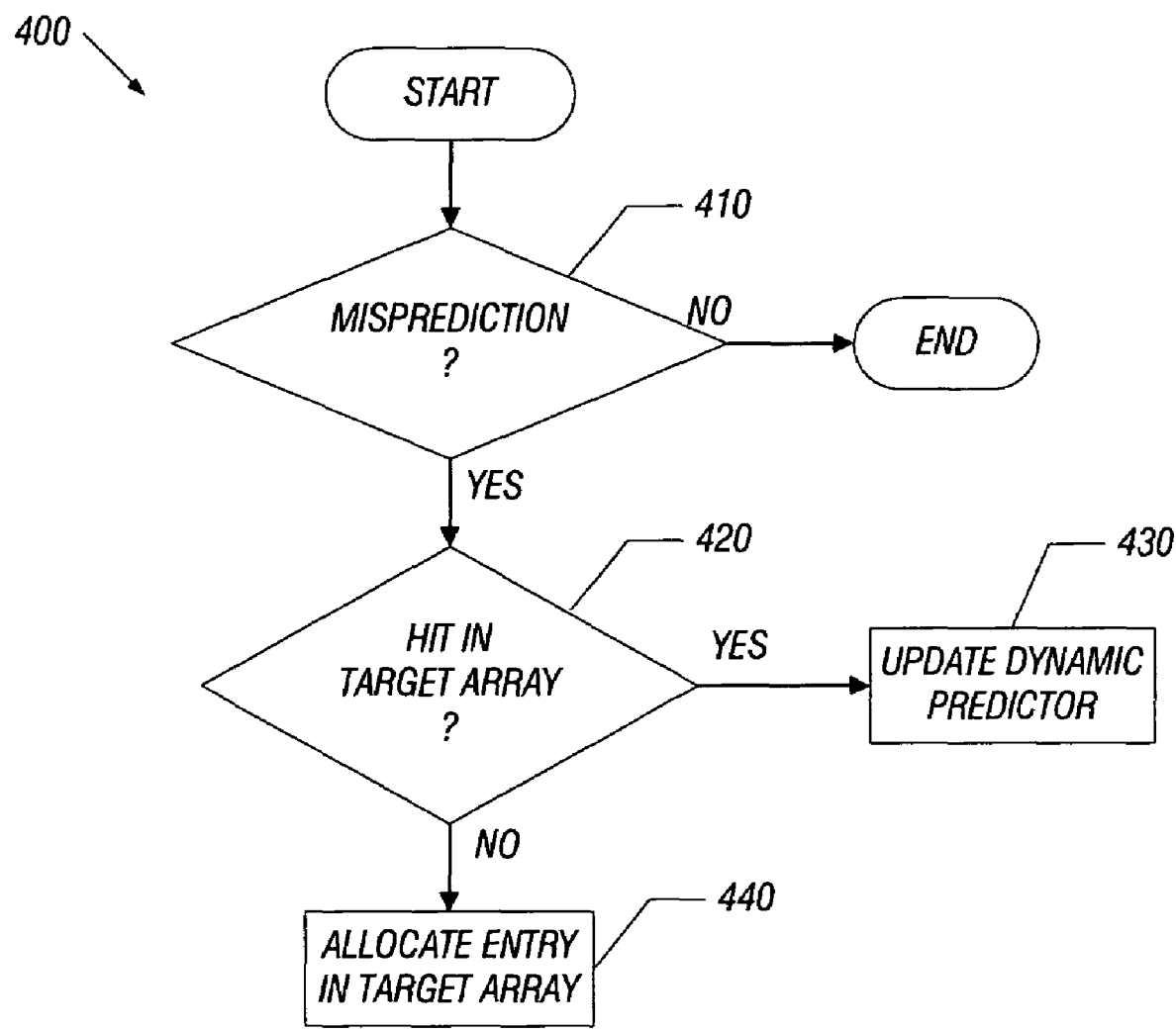
FIG. 5 is a flow diagram of an allocation method in accordance with another embodiment of the present invention.

Allocations may also be made to a target array when information for a branch is not present in the target array. Referring now to FIG. 5, shown is a flow diagram of an allocation method for a dynamic predictor in accordance with one embodiment of the present invention. As shown in FIG. 5, method 400 may begin by determining whether a misprediction occurs (diamond 410). Note that the determination of diamond 410 (and all of method 400), may be implemented between blocks 205 and 210 of FIG. 3, discussed above. That is, at execution time it may be determined whether a branch prediction was correct or incorrect. If no misprediction occurs, method 400 may conclude. Alternately, if a misprediction occurs, control passes from diamond 410 to diamond 420. There, it may be determined whether an address of the branch hit in a target array (diamond 420). If so, this means that the dynamic prediction obtained based on the hit was incorrect. Accordingly, control passes to block 430, where the dynamic predictor may be updated with correct information regarding the branch.

Referring still to FIG. 5, if instead it is determined at diamond 420 that the address missed in the target array, control passes to block 440. There, an entry may be allocated in the target array for this address (block 440). In various embodiments, different information may be stored in an entry allocated in the target array. For example, a static prediction of the branch may be stored and could be gated by conditional branch type information, along with an offset, a branch type, and a target, among other such information. Note that in some embodiments, the static prediction field may only be written for conditional branches. In embodiments in which an L2 static predictor is present, information from the target array entry, namely the static prediction and offset, may be used to determine whether to allocate an entry to the L2 static predictor, as discussed above with regard to FIG. 3. While shown with this particular implementation in the embodiment of FIG. 5, it is understood that the scope of the present invention is not limited to this implementation.

Figure 6:
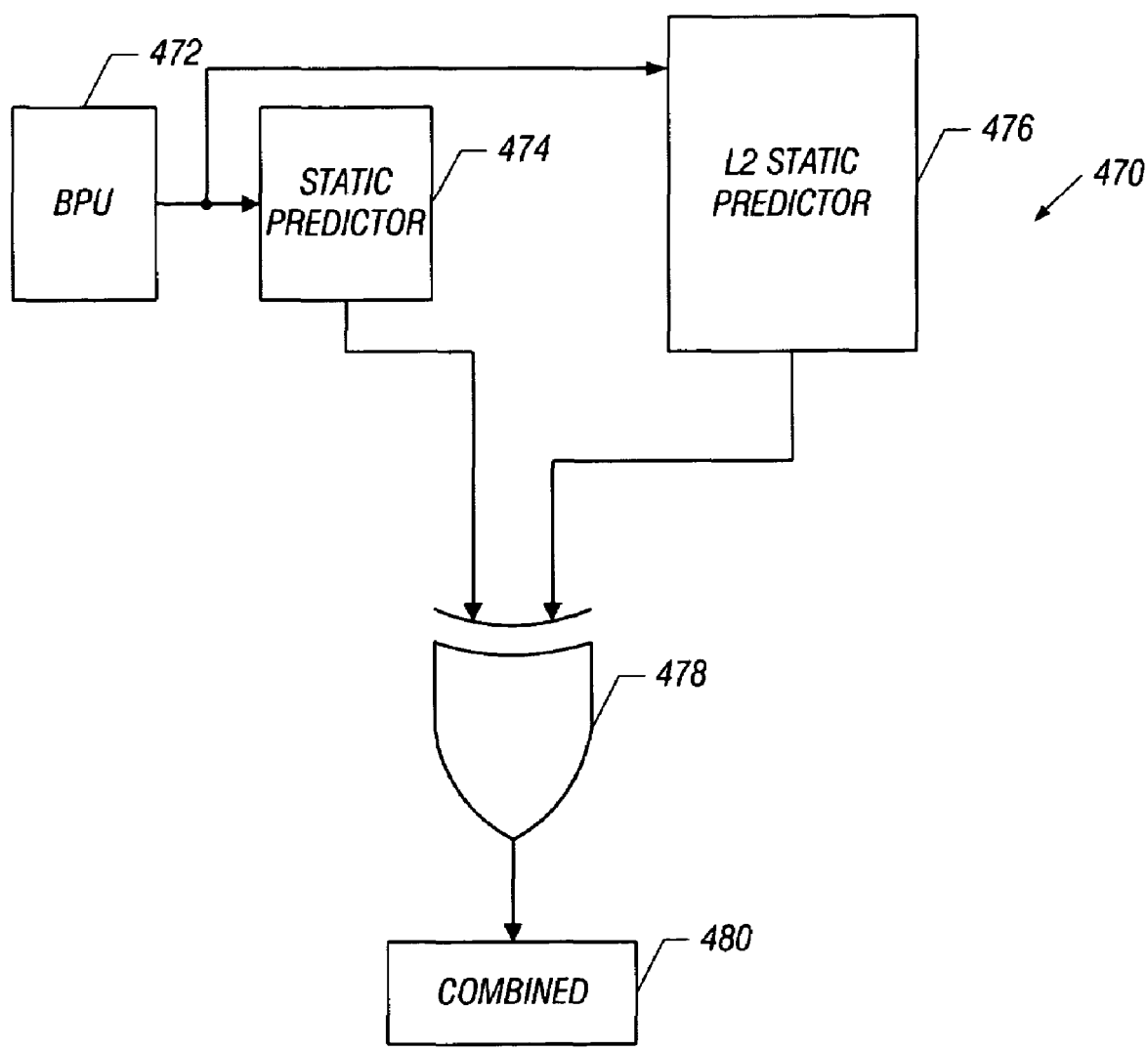
FIG. 6 is a block diagram of predictor structures in accordance with an embodiment of the present invention.

Referring now to FIG. 6, shown is a block diagram of predictor structures in accordance with an embodiment of the present invention. While shown as a unit for purposes of illustration, the individual components described below may be located in various locations within the front end and middle sections of the processor pipeline (e.g., at different stages shown in FIG. 1 stages 20 and 30). As shown in FIG. 6, a prediction unit 470 may include a branch predictor unit (BPU) 472. BPU 472 may be a dynamic predictor, and may include a target array and one or more levels of predictions, such as serial bimodal, local, and global predictors, although the scope of the present invention is not limited in this regard. As shown in FIG. 6, BPU 472, which may be in a front end stage of a pipeline, may be coupled to a static predictor 474 and an L2 static predictor 476, both of which may reside in a middle stage of the pipeline. Static predictor 474 may provide a prediction on a miss to the target array within BPU 472. That is, when dynamic prediction information is unavailable for a given branch address, static predictor 474 may provide a static prediction.

While the static prediction is generally accurate, to improve accuracy even further, L2 static predictor 476 may be used. L2 static predictor 476 may include entries that were thrashed (i.e., evicted) from the target array within BPU 472. More particularly, as discussed above L2 static predictor 476 may include entries corresponding to addresses of conditional branches in which the expected static prediction is likely to be in conflict with the actual resolved direction of the branch.

Still with reference to FIG. 6, a branch address may be used to access both static predictor 474 and L2 static predictor 476 on a miss in the target array in BPU 472. If an entry exists in L2 static predictor 476, this hit will invert the output of static predictor 474, as represented by the logical exclusive-or (XOR) gate 478. In various embodiments, this XOR functionality may be performed by software, firmware, or hardware, and may implement the method set forth in FIG. 2, above. In one embodiment, a final prediction may be generated by the XOR operation in accordance with Table 1, below.

TABLE 1

| Static Prediction | Hit in L2 Predictor | Final Prediction |
|---|---|---|
| 0 | 0 | 0 |
| 0 | 1 | 1 |
| 1 | 0 | 1 |
| 1 | 1 | 0 |

Note that the L2 static (i.e., thrash) prediction may also be combined with the static prediction to provide the final prediction, as represented by the combined block 480. The final prediction is used in the middle section of the pipeline illustrated in FIG. 1, and checked in the back end pipestages of FIG. 1.

Figure 7:
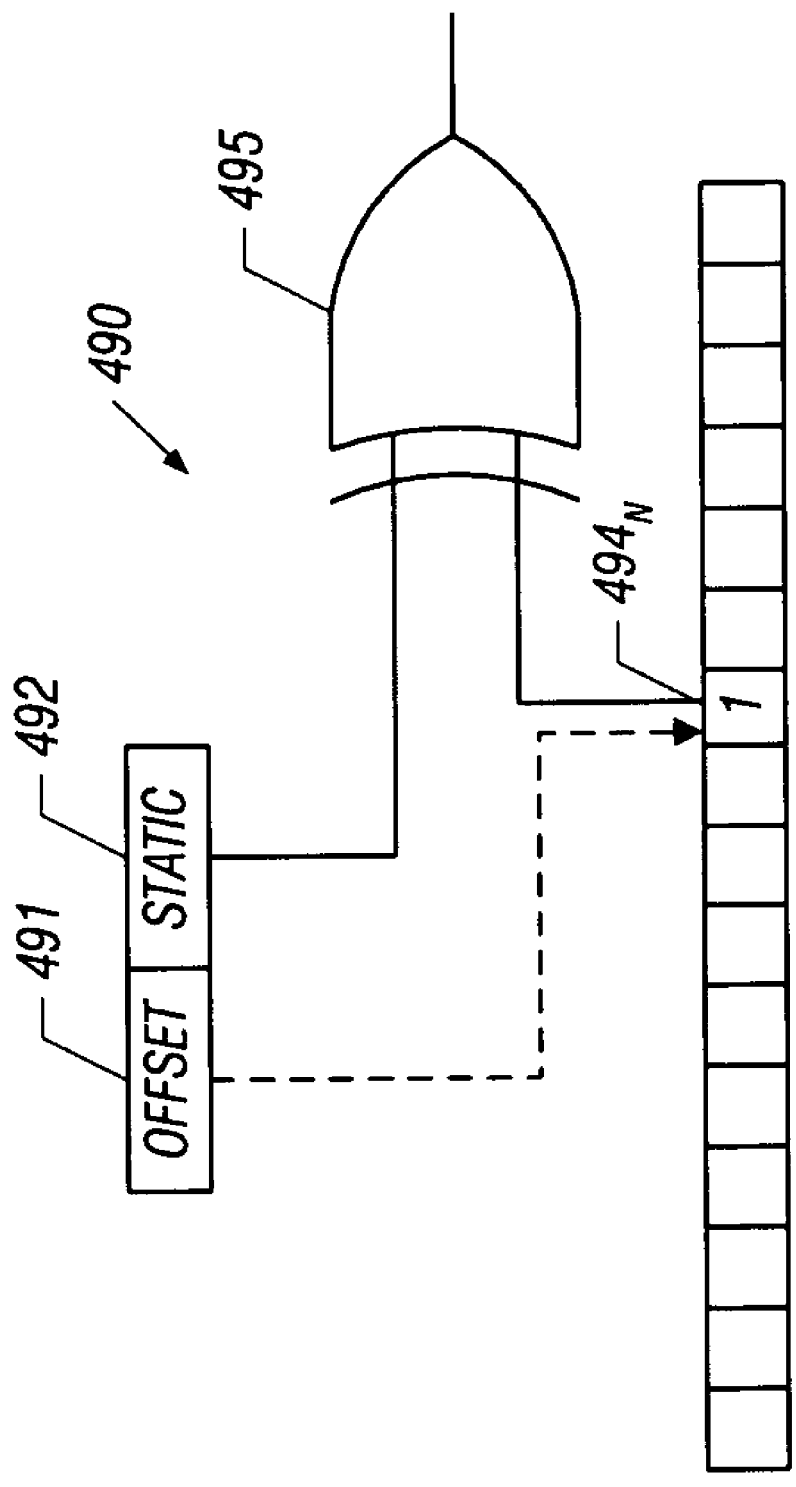
FIG. 7 is a block diagram of allocation circuitry in accordance with an embodiment of the present invention.

Referring now to FIG. 7, shown is a block diagram of circuitry used to allocate into an L2 static predictor in accordance with an embodiment of the present invention. As shown in FIG. 7, circuit 490 may include an XOR gate 495 that is coupled to receive an evicted dynamic prediction. More specifically, a prediction vector 494 of a current block (i.e., a prediction for a line of bytes) may also include an evicted dynamic prediction, shown in FIG. 7 as evicted prediction $494_N$. Prediction vector 494 may be the output of all predictors in BPU 472 or a simplified version corresponding to a subset of predictors within BPU 472. This evicted dynamic prediction may be compared to a corresponding static prediction 492. Note that this static prediction and an offset value 491 which is used to point to and access evicted dynamic prediction $494_N$ from prediction vector 494, may be obtained from the evicted target array entry. Based on the operation at XOR gate 495, if the evicted dynamic prediction $494_N$ does not match static prediction 492, an entry in the L2 static predictor may be allocated. Thus only evicted entries from a target array that are not expected to predict correctly using a static prediction may be allocated to the L2 static predictor, reducing its size. Furthermore, note that only conditional branches may be allocated to an L2 static predictor. The static bit may be gated on allocation by conditional branch type information. Note again that the XOR functionality may be performed by hardware, firmware or hardware, in various embodiments.

Embodiments may provide performance improvements, especially for server and other applications having large working sets. Furthermore, embodiments may enhance static predictions efficiently, as common static behavior in programs may be leveraged to filter most predictions, allowing L2 static predictor to extend its effective coverage and performance potential. Furthermore, an L2 static predictor may be located outside the most critical prediction loop(s), providing for efficient implementation and avoiding timing criticalities.

Figure 8:
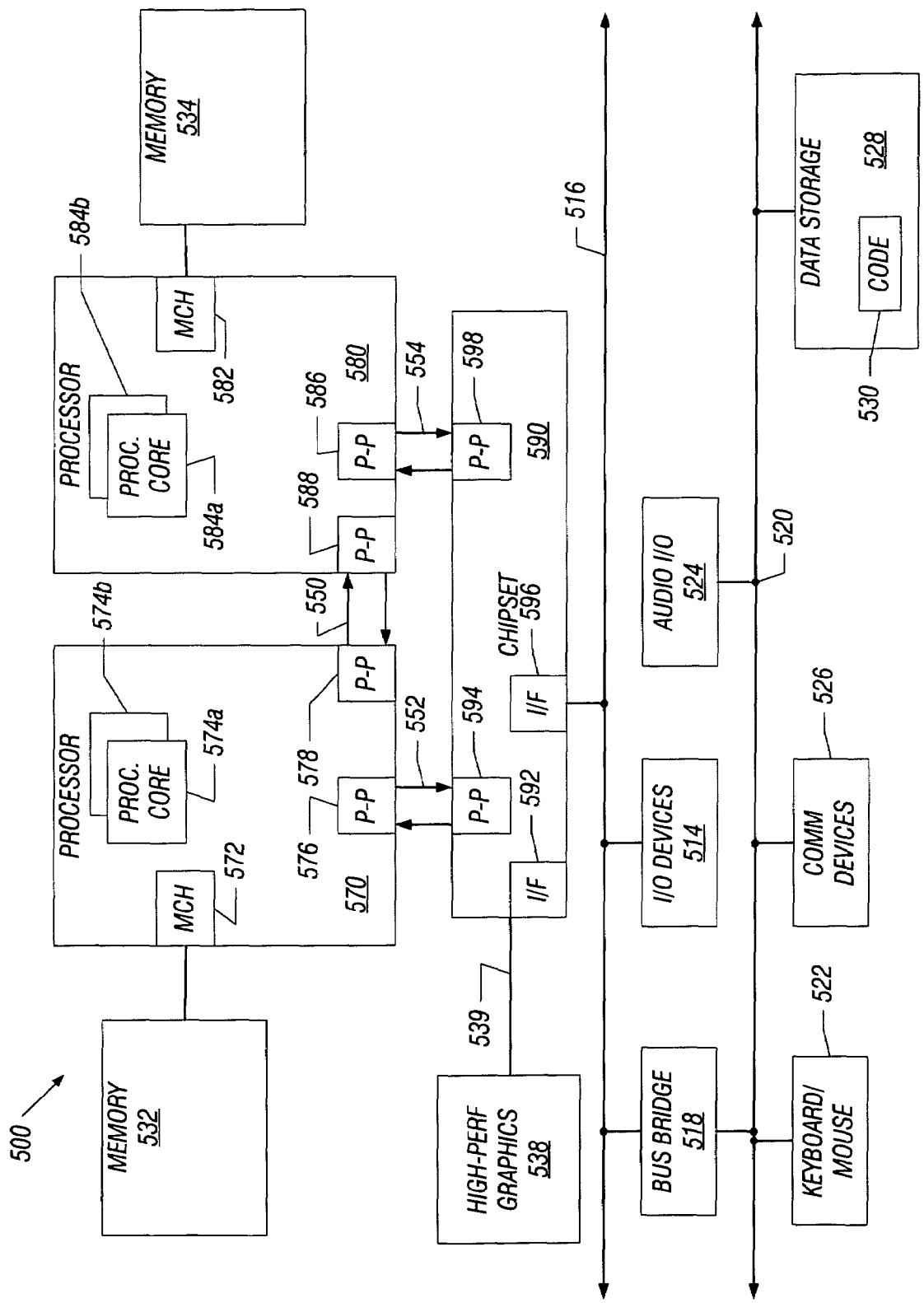
FIG. 8 is a block diagram of a system in accordance with an embodiment of the present invention.

Embodiments may be implemented in many different system types. Referring now to FIG. 8, shown is a block diagram of a system in accordance with an embodiment of the present invention. As shown in FIG. 8, multiprocessor system 500 is a point-to-point interconnect system, and includes a first processor 570 and a second processor 580 coupled via a point-to-point interconnect 550. As shown in FIG. 8, each of processors 570 and 580 may be multicore processors, including first and second processor cores (i.e., processor cores 574a and 574b and processor cores 584a and 584b). Note that each of the cores may include an L2 static predictor in accordance with an embodiment of the present invention.

First processor 570 further includes point-to-point (P-P) interfaces 576 and 578. Similarly, second processor 580 includes P-P interfaces 586 and 588. As shown in FIG. 8, memory controller hubs (MCH's) 572 and 582 couple the processors to respective memories, namely a memory 532 and a memory 534, which may be portions of main memory locally attached to the respective processors.

First processor 570 and second processor 580 may be coupled to a chipset 590 via P-P interconnects 552 and 554, respectively. As shown in FIG. 8, chipset 590 includes P-P interfaces 594 and 598. Furthermore, chipset 590 includes an interface 592 to couple chipset 590 with a high performance graphics engine 538. In one embodiment, an Advanced Graphics Port (AGP) bus 539 may be used to couple graphics engine 538 to chipset 590. AGP bus 539 may conform to the Accelerated Graphics Port Interface Specification, Revision 2.0, published May 4, 1998, by Intel Corporation, Santa Clara, Calif. Alternately, a point-to-point interconnect 539 may couple these components.

In turn, chipset 590 may be coupled to a first bus 516 via an interface 596. In one embodiment, first bus 516 may be a Peripheral Component Interconnect (PCI) bus, as defined by the PCI Local Bus Specification, Production Version, Revision 2.1, dated June 1995 or a bus such as a PCI Express™ bus or another third generation input/output (I/O) interconnect bus, although the scope of the present invention is not so limited.

As shown in FIG. 8, various I/O devices 514 may be coupled to first bus 516, along with a bus bridge 518 which couples first bus 516 to a second bus 520. In one embodiment, second bus 520 may be a low pin count (LPC) bus. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520. Note that other architectures are possible. For example, instead of the point-to-point architecture of FIG. 8, a system may implement a multi-drop bus or another such architecture.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   determining if an entry corresponding to a prediction address that misses in a target array of a branch predictor is present in a second predictor;
   overriding a prediction output corresponding to the prediction address from a first predictor if the entry is present in the second predictor, the first and second predictors each comprising a static predictor; and
   inserting the entry into the second predictor only when an evicted entry from the branch predictor contradicts a corresponding prediction output of the first predictor.

2. The method of claim 1, further comprising using the overridden prediction output in a first portion of a processor pipeline, wherein the branch predictor is present in a prior portion of the processor pipeline.

3. The method of claim 1, further comprising comparing a prediction in a prediction vector of a current branch corresponding to the evicted entry to the prediction output of the first predictor, wherein the first predictor comprises a heuristic predictor.

4. The method of claim 1, wherein overriding the prediction output comprises inverting the prediction output.

5. The method of claim 1, further comprising deallocating the entry in the second predictor if the overridden prediction is incorrect.

6. An apparatus comprising:
a prediction unit to store entries corresponding to prediction entries evicted from a target array of a branch prediction unit, the prediction entries each including dynamic prediction information for a prediction address, the prediction unit further including a static predictor to generate a static prediction for the prediction address that is to be overridden if the prediction address hits in the prediction unit, wherein the branch prediction unit comprises a front end pipeline stage of a processor and the prediction unit comprises a middle pipeline stage of the processor, wherein an entry is to be stored in the prediction unit only if an evicted entry from the target array of the branch prediction unit includes dynamic prediction information that contradicts the static prediction for the prediction address.

7. The apparatus of claim 6, further comprising logic to compare a portion of a prediction vector of a current branch address to the static prediction corresponding to the evicted entry, and based on the comparison to allocate an entry into the prediction unit.

8. The apparatus of claim 6, wherein the static predictor and the prediction unit are to be accessed if the prediction address does not hit in the target array of the branch prediction unit.

9. The apparatus of claim 6, further comprising a deallocator to deallocate an entry in the prediction unit if an overridden static prediction is incorrect.

10. A system comprising:
a first predictor of a front end pipeline stage of a processor to dynamically predict a direction of a branch based on an entry in the first predictor;
a second predictor of a middle pipeline stage of the processor coupled to the first predictor to statically predict the direction of the branch, if the entry corresponding to the branch is not present in a target array of the first predictor;
a third predictor of the middle pipeline stage of the processor coupled to the second predictor to override the static prediction of the second predictor if an entry corresponding to the branch is present in the third predictor;
combination logic coupled to an output of the second predictor and an output of the third predictor to override the static prediction if the branch hits in the third predictor;
a first allocator to receive an evicted entry from the first predictor and to allocate an entry in the third predictor only when a dynamic prediction of the evicted entry differs from a corresponding static prediction statically predicted by the second predictor; and
a disk drive coupled to at least the third predictor.

11. The system of claim 10, further comprising a second allocator to allocate an entry in the first predictor if a branch is mispredicted and no information corresponding to the branch exists in the target array.

12. The system of claim 10, further comprising a deallocator coupled to to the third predictor to deallocate an entry in the third predictor if the entry is used to predict a result and the result is mispredicted.

* * * * *